Jan. 19, 1960
R. E. LOUDON
2,922,087
COINCIDENCE CIRCUIT
Filed Feb. 21, 1957
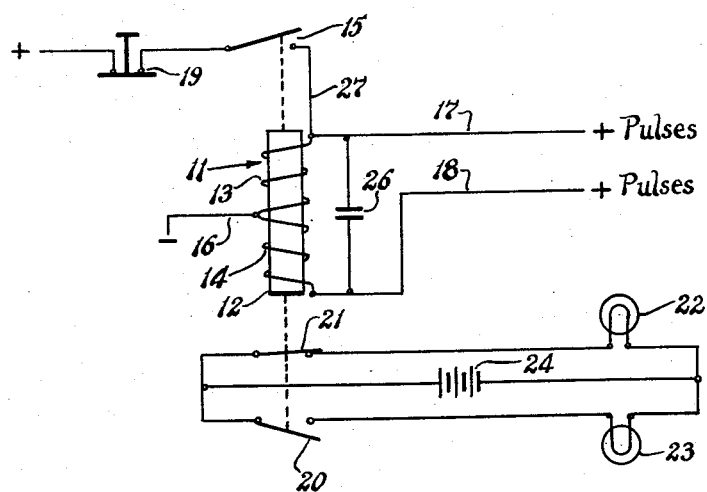
INVENTOR,
Robert E. Loudon
ATTORNEY.

United States Patent Office 2,922,087
Patented Jan. 19, 1960

2,922,087

COINCIDENCE CIRCUIT

Robert E. Loudon, Los Angeles, Calif., assignor to Clary Corporation, San Gabriel, Calif., a corporation of California Application February 21, 1957, Serial No. 641,717

3 Claims. (Cl. 317—155.5)

This invention relates to coincidence circuits capable of indicating or otherwise responding to either coincidentally received or non-coincidentally received pulses applied over two separate circuits, and has particular reference to circuits of this type involving relays actuated by such pulses.

The principal object of the present invention is to provide a simple coincidence responsive circuit of the above type which will respond in different manners to concurrently or non-concurrently received pulses.

Another object is to provide a simple relay type coincidence responsive circuit which will indicate whether pulses are transmitted concurrently or non-concurrently over two pulse transmission circuits.

The manner in which the above and other objects of the invention are accomplished will be readily understood on reference to the following specification when read in conjunction with the accompanying drawing, wherein:

The figure indicates a circuit diagram of a coincidence indicating device embodying a preferred form of the present invention.

Referring to the drawing, the coincidence representing circuit includes a double wound relay, generally indicated at 11, including a magnetic core 12 and two windings 13 and 14 wound in opposition to each other and each capable of inducing a magnetic flux in the core effective to close normally open contacts 15 in a holding circuit.

The adjacent ends of the coils 13 and 14 are connected through a common line 16 on the minus side of a D.C. power source. The opposite outer ends of the coils are connected by lines 17 and 18 to pulse sources which are connected in a manner not shown to the plus side of the D.C. power source whereby each pulse source can apply pulses of positive potential to the respective sides of the windings.

The holding circuit, including the contacts 15, is connected through a normally closed switch 19 to the plus side of the D.C. power source. The contacts 15 are connected through line 27 to the upper end of the coil 13 and are thus effective upon energization of the relay by a pulse received over either line 17 or 18 to close, completing a circuit through coil 13 and line 16 to thus lock the relay in energized condition.

Although any form of coincidence utilizing, indicating or representing circuit may be used, I have chosen, for the present disclosure, to illustrate the same as comprising normaly open contacts 20 and normally closed contacts 21 located in the relay. The normally closed contacts 21 are located in series with an indicating lamp 22 and power source 24 to thereby normally indicate the deenergized condition of the relay, i.e. a condition wherein pulses have been either received coincidentally or not received. The normally open contacts 20 are connected in series with an indicating lamp 23 and the power source 24 to indicate the energized condition of the relay, i.e., a condition wherein a pulse has been received over either line 17 or 18, but wherein no pulses have been received coincidentally.

According to the present invention, a capacitor 26 is connected across lines 17 and 18.

The operation of the relay is as follows: If a pulse is received solely over line 17, a circuit will be completed through the winding 13 and line 16. The relay will thus become energized to close the holding contacts 15 to lock the relay in its energized condition. The contacts 20 will thereby be closed to illuminate the indicating lamp 23 while the contacts 21 will be opened to extinguish the indicating lamp 22. The circuit will be so maintained until the switch 19 is opened either manually or by any suitable outside source.

If a pulse is received solely over line 18, a circuit will be completed through the winding 14 and line 16. Normally, in the absence of the capacitor 26, the contacts 15 upon closing would apply a positive potential from the D.C. source connected to the holding circuit to energize the winding 13 in an opposing or bucking relation to the winding 14 and thus drop the relay so that the contacts would reopen and the relay would return to its deenergized position shown in the figure. However, by applying the capacitor 26 across the lines 17 and 18, the pulse applied to line 18 would energize one of the windings to a greater extent than the other, causing the resulting flux to close the contacts 15. As the latter close, current passing therethrough from the supply of positive potential maintains the winding 13 energized. The interaction of the windings 13 and 14, and the capacitor 26, is such that the contacts 15 are held closed until after the pulse applied over line 18 dies out, leaving the holding contacts 15 closed. Thus, the magnetic flux induced by the now energized winding 13 becomes effective to maintain contacts 15 closed. Therefore, the relay will be held locked in energized condition causing the lamp 23 to indicate a non-coincidentally received pulse.

If two pulses are received concurrently on lines 17 and 18, the windings 13 and 14 will directly buck each other and thus prevent the relay from becoming energized. Therefore, the lamp 22 will remain illuminated.

In operation, it has been found that by utilizing ordinary relays having windings of approximately 200 ohms each and a capacitor 26 of four microfarads, pulses from 3 to 50 milliseconds in duration can be satisfactorily tolerated on either of lines 17 and 18 without causing malfunctioning of the relay.

Although I have described my invention in detail and have, therefore, used certain terms and languages herein, it is to be understood that the present disclosure is illustrative rather than restrictive and that changes and modifications may be made without departing from the spirit or scope of the invention as set forth in the claims appended hereto.

I claim:

1. A pulse coincidence indicating apparatus comprising the combination of a first electromagnetic winding, a second electromagnetic winding, said windings being magnetically intercoupled, circuits for applying pulses to respective ones of said windings, said windings being arranged so that the magnetic flux induced by one thereof is in opposition to the magnetic flux induced by the other thereof, a holding circuit including normally open contacts closed by the magnetic flux induced by either of said windings when either of said windings is energized, said holding circuit including one of said windings in series with said contacts; a capacitor connected across said first mentioned windings, and an indicator circuit including switch contacts operated by the magnetic flux induced by either of said windings.

2. A coincidence responsive circuit comprising the combination of a first electromagnetic winding, a second electromagnetic winding, said windings being magnetically intercoupled, circuits for applying D.C. pulses to respective ones of said windings, said windings being arranged so that the magnetic flux induced by said first winding is in opposition to the magnetic flux induced by said second winding, a holding circuit including normally open contacts closed by the magnetic flux induced by either of said windings when either of said windings is energized, said holding circuit including said first winding connected in series with said contacts, and a source of D.C. potential of the same polarity as the D.C. pulses applied to said first winding; a capacitor connected across said first and second windings, and an indicator circuit including switch contacts operated by the magnetic flux induced by either of said windings.

3. A coincidence responsive circuit comprising the combination of a relay having a first electromagnetic winding and a second electromagnetic winding, means connecting one of the ends of each of said windings to one side of a direct current source, means connecting the opposite ends of said windings to separate pulse sources connected to the opposite side of said direct current source, a holding circuit including normally open contacts closed by said relay upon energization of either of said windings, said holding circuit including said first winding connected in series with said contacts, said holding circuit being connected to said opposite side of said power source, a capacitor connected across said pulse sources, and an indicator circuit including a normally open circuit closed by the magnetic flux induced by either of said windings.

References Cited in the file of this patent

UNITED STATES PATENTS

| | | |
|---|---|---|
| 2,152,524 | Miller | Mar. 28, 1939 |
| 2,727,189 | Bastow | Dec. 13, 1955 |
| 2,763,817 | Blair | Sept. 18, 1956 |
| 2,828,481 | Latapie | Mar. 25, 1958 |

FOREIGN PATENTS

| | | |
|---|---|---|
| 598,717 | Great Britain | Jan. 12, 1939 |
| 149,907 | Australia | Feb. 9, 1953 |
| 697,140 | Great Britain | Sept. 16, 1953 |